United States Patent [19]

Lockridge et al.

[11] Patent Number: 5,284,694
[45] Date of Patent: Feb. 8, 1994

[54] STRESS-WHITENING EMBOSSABLE FILM

[75] Inventors: Rochelle L. Lockridge, Maplewood, Minn.; Dennis L. Krueger, Hudson, Wis.; Philip G. Martin, White Bear Lake, Minn.; Gary W. Schlaeger, Austin, Tex.

[73] Assignee: Minnesota Mining and Manufacturing Company, St. Paul, Minn.

[21] Appl. No.: 935,518

[22] Filed: Aug. 25, 1992

[51] Int. Cl.⁵ .................................. B32B 3/30
[52] U.S. Cl. ..................................... 428/137; 428/40; 428/131; 428/134; 428/195; 428/201; 428/203; 428/207; 428/343; 428/412; 428/515; 428/517; 428/518; 428/520; 428/519; 428/521; 428/522; 428/523; 428/516; 428/913; 428/918; 428/156; 428/161; 428/162; 428/163; 428/167; 428/174; 428/179; 428/181; 525/240; 525/232; 525/146; 525/86; 525/70; 525/84; 524/291
[58] Field of Search ............... 428/40, 131, 137, 134, 428/195, 201, 203, 207, 343, 412, 515, 517, 518, 520, 519, 521, 522, 523, 516, 913, 918, 156, 161, 162, 163, 167, 174, 179, 181; 525/240, 232, 146, 86, 70, 84; 524/291

[56] References Cited

U.S. PATENT DOCUMENTS

| 2,925,625 | 2/1960 | Souza | 18/61 |
|---|---|---|---|
| 2,996,822 | 8/1961 | Souza | 40/136 |
| 3,036,945 | 5/1962 | Souza | 154/53.5 |
| 3,542,630 | 11/1970 | Pfiffner | 161/6 |
| 3,650,059 | 3/1972 | Johnson | 40/316 |
| 3,887,734 | 6/1975 | Chazan | 428/40 |
| 4,082,711 | 4/1978 | Andrascheck et al. | 260/23 X |
| 4,463,119 | 7/1984 | Mucke et al. | 524/269 |
| 4,489,841 | 12/1984 | Thompson | 215/230 |
| 4,731,401 | 3/1988 | Moteki et al. | 525/240 |
| 4,962,148 | 10/1990 | Orikasa et al. | 525/86 |
| 5,021,504 | 6/1991 | Fujita et al. | 525/146 |

Primary Examiner—Ellis P. Robinson
Assistant Examiner—William P. Watkins, III
Attorney, Agent, or Firm—Gary L. Griswold; Walter N. Kirn; Darla P. Neaveill

[57] ABSTRACT

An embossable sheet, having at least one stress-whitening layer comprising a blend of:
  a) at least one heat-stable polymer selected from the group consisting of polypropylene and a polymethyl alkene, said alkene having from about 3 to about 7 carbon atoms,
  b) at least one other polymeric material immiscible therewith, and
  c) an effective amount of an antioxidant, said sheet exhibiting stress-whitening which is stable at 136° C. for at least about 7 days.

16 Claims, No Drawings

STRESS-WHITENING EMBOSSABLE FILM

BACKGROUND OF THE INVENTION

1. Field of the Invention

The invention relates to embossable films which stress whiten or craze when pressure is applied thereto. The films are especially useful for wire identification.

2. Description of the Related Art

A wide variety of materials and methods have been used to produce identification means, e.g., tags, labels and the like, for a range of applications. One type of identification device known in the art involves film or sheet material, usually in tape form, which may be imprinted using an embossing device. One embodiment is an embossable label material which changes color during embossing. This results in improved contrast of the image symbols, which are usually white, compared to the background color. Formation of this white color by embossing is typically referred to as stress-whitening. Embossed labels of this type are disclosed in U.S. Pat. Nos. 2,925,625; 2,996,822; 3,036,945; 3,650,059; 3,887,734 and 3,542,630. Material disclosed in these patents, when provided in tape form, are useful for producing labels using an embossing labeler. Labels obtained by prior art methods exhibited good contrast between image symbols and label background.

The majority of these plastic labels require polyvinyl chloride or copolymers of polyvinyl chloride. Polypropylene or polymethylmethacrylate may be incorporated therein.

All of these compositions have one distinct drawback. If the label is subjected to sufficient heat, the plastic will anneal, and the stresses caused by embossing will be released. The image thus disappears and identification is lost.

It has now been discovered that compositions of the present invention, comprising blended polymer sheets or tapes, overcome this problem and exhibit image retention at temperatures significantly higher than prior art compositions.

SUMMARY OF THE INVENTION

The invention provides a sheet or tape material which may be used for making signs or identification labels which possesses the property of stress-whitening. Identification marks or sign legends are produced by the exertion of pressure by a suitable embossing tool or labeler. The functional material may be provided in single sheet form or it may be a multilayer structure.

Specifically, the invention provides an embossable sheet, having at least one stress-whitening layer comprising a blend of:
a) at least one heat-stable polymer selected from the group consisting of polypropylene and a polymethylalkene, said alkene having from about 3 to about 7 carbon atoms,
b) at least one other polymeric material immiscible therewith, and
c) an effective amount of an antiaging agent, said sheet exhibiting stress-whitening which is stable at 136° C. for at least about 7 days. Embossable sheets of the invention may comprise a single layer or may be multilayer sheets comprised of 2 or more layers, each of which may contain blends of olefins, ABS, and ionomers. The sheet exhibits stress whitening upon the application of pressure, which is stable to about 136° C. for at least about 7 days, preferably to about 150° C. for at least about 7 days.

The additional layers may be included for purposes such as providing color to the sheet or tape, adding adhesive for attachment of the sign or label to other surfaces or substrates, protecting the embossed surface, and the like.

Preferred embossable sheets according to the invention comprise at least one stress-whitening layer comprising a major proportion of the heat-stable polymer and a minor proportion of an immiscible polymeric material selected from acrylonitrile-butadiene styrene (ABS) copolymers, polycarbonates, polymethylmethacrylates, polystyrenes, and styrene-acrylonitrile copolymers.

In one preferred embodiment, the embossable sheets comprise from about 50% to about 95% polypropylene, and correspondingly, from about 50 to about 5% of an acrylonitrile-butadiene-styrene copolymer, wherein said sheets exhibit stress whitening upon the application of pressure, said whitening being stable to about 150° C. for at least about 7 days.

In another preferred embodiment the embossable sheets comprise from about 50% to about 95% polymethyl pentene (PMP), and correspondingly, from about 50 to about 5% of an acrylonitrile-butadiene-styrene copolymer wherein said sheets exhibit stress whitening upon the application of pressure, said whitening being stable to about 150° C. for at least about 7 days.

When the sheet is prepared and used according the invention, an embossed image is formed with white embossed symbols against a transparent, neutral, opaque or colored background. The images formed by embossing are unusually stable, particularly when exposed to elevated temperatures. Thus, articles of the invention remain unchanged at temperatures which destroy images produced with previously disclosed stress-whitening sheets or tape.

DETAILED DESCRIPTION OF THE INVENTION

Articles of the present invention may be provided in sheet or tape form. These materials are capable, under suitable circumstances, of forming clearly visible images wherein the image symbols are relatively sharply defined against a selected background. The background may be clear, colorless, tinted or opaque with color provided by the addition of suitable pigments. The background selection affects the acuity of the image which is usually white in color. The image is formed during the application of pressure to the sheet or tape products. A suitable means of applying pressure is the use of a means of embossing such as a device used to make embossed labels. The sheet or tape material is subjected to stresses during the embossing process which causes the sheet to deform. At the points of greatest deformation crazes or voids form in the material. This change modifies the passage of light through the sheet by scattering light from the sheet. The result of light scattering from these crazes or voids is the formation of white symbols which become visible against the background of the original color of the unstressed sheet. This type of color formation is generally referred to as stress whitening.

Sheet or tape products suitable for the present invention have a thickness in the range of from about 25 micrometers (1 mil) to about 1 millimeter (40 mils), with from about 150 micrometers to about 300 micrometers (7-12 mils) being preferred. The same materials may be used in the production of both sheet and tape formats.

Suitable materials for sheet formation are usually derived from polymeric compositions which are described as rigid or semi-rigid. Rigid or semi-rigid materials are characterized by certain physical properties. They normally exhibit tensile values in the region of 264 kg/cm$^2$ (3,750 psi) to 369 kg/cm$^2$ (5,250 psi). Elongation values will typically range from about 250% to about 350%.

Stress-whitening characteristics are provided in both single and multilayer sheets of the invention. It is possible, for instance, to apply embossing pressure to single layer structures and observe whitening and image formation in the stressed areas. These images tend to display good contrast between image and background areas. However, image edges may be fuzzy and lacking in crisp definition. Improvements in image appearance are possible using multilayer structures and processing techniques. Two layer and three layer structures have been studied; image improvement is most noticeable with three layer sheets.

Whether single or multilayer sheets are provided, the function of stress-whitening occurs within a single layer of material. This layer comprises a blend of immiscible polymers which separate into domains. The size of the domains influences the appearance of the final sheet. Appearance of this single layer after embossing varies from somewhat transparent to translucent.

The stress-whitening layer comprises a polymer blend. A major proportion of the blend is derived from a heat-stable polymer selected from polypropylene and a polymethylalkene wherein the alkene has from about 4 to about 7 carbons in the alkyl chain. These polymers exhibit some tendency to stress-whiten alone, this property is significantly improved by blending polymers such as acrylonitrile-butadiene-styrene copolymers, polymethylmethacrylate, polystyrene, polycarbonate, and styrene-acrylonitrile with the heat-stable polymers.

However, the ratios in the blend much be carefully controlled. Contrast between image and background is reduced as the concentration of the second polymer is increased; it is preferable that the majority of the polymer blend comprise the heat-stable polymer.

Preferred embodiments of the invention contain from about 50% to about 90% of a heat-stable polymer selected from the group consisting of polypropylene and polymethylpentene, correspondingly from about 45% to about 5% of acrylonitrile-butadiene styrene, polymethylmethacrylate, polystyrene, polycarbonate, or styrene-acrylonitrile, and from about 0.05% to about 2% of an antioxidant.

In addition to the blend of two polymers, it is preferred to add an antiaging agent to the stress-whitening layer in order to further improve the aging characteristics of the polymer blend. Useful antiaging agents include UV stabilizers, heat stabilizers and antioxidants. These agents reduce the tendency for the sheet to discolor and become brittle with age and/or heat. Useful materials include, but are not limited to, hindered amines, nickel complexes, benzophenones, benzotriazolers, and the like, including the antioxidants available under the trade name Irganox TM, from Ciba Geigy. The antiaging agent may be present in amounts up to about 5%, preferably from about 0.5% to about 2%.

Single layer sheets, comprising blended polymers, of the type described above, may be further enhanced by the addition of color. It is important to maintain maximum contrast between the white image and the background color. For this reason the enhancing color is usually in the form of a colorant which is soluble in the polymer blend. The embossable sheet then becomes either translucent or opaque in appearance. It is also possible to add pigmented colorants. This is, however, less desirable since the pigments tend to interfere with the image contrast.

Other optional ingredients may also be present in the stress-whitening layer including elastomers, lubricants, antistatic polymers, and the like.

A preferred embodiment exhibiting improved image contrast is obtained by placing an intense pigmented layer behind the stress-whitening layer. This yields a bi-layer structure. In this embodiment, the image forming, stress-whitening layer is attached to a backing layer which comprises a pigmented polymer, typically such polymer is also blended with a polyolefin to improve cohesion of the layers. This pigmented layer preferably contains a substantial proportion of polypropylene to which is added a precompounded colored pigment concentrate. Other polyolefins may also be used in the pigmented layer; very low density polyethylene (VLDPE) may be added to the pigment layer in proportions ranging from 0 to about 60 weight percent, preferably up to about 40%; however, layers with no VLDPE are most preferred.

Other ingredients may also be present in the colored layer. A small amount of Surlyn TM ionomer may be used as a nucleating agent; antioxidant may also be added to this layer. When present, Surlyn TM is added in the range of from 0 to about 10%, preferably from about 3% to about 5%.

Using a colored backing sheet of suitable color strength provides a sharper contrast between the white image and the background than that seen in a single layer embodiment. There is also some improvement in image definition. The preferred levels of pigmentation for optimum image appearance are from about 10% to 100%.

Further improvements in image contrast are possible by placing a transparent layer or "clear coat" over the stress-whitening layer. This three layer embodiment contains the imaging, stress-whitening layer sandwiched between the transparent layer and a pigmented underlayer. The transparent top layer may comprise any transparent film-forming polymer. Preferred embodiments comprise a very low density polyethylene (VLDPE)/polypropylene blend, having a majority of polypropylene. VLDPE materials are selected from such as ethylene α-olefin copolymers containing from about 5 to about 15 mole percent of an α-olefin, preferably a butene, hexene, or octene. Molecular weights of these materials range from 135,000 to about 266,000 with polydispersities ranging from about 3.72 to about 5.98.

Small amounts of antiaging agents, such as UV stabilizers and antioxidants may also be added to the top layer. When used, the amounts range up to about 2%, preferably about 0.5%.

As well as improving the appearance of imaged sheets of the invention, the multilayer sheets are less susceptible to premature stress-whitening than single layer sheets. Single layer sheets must be carefully handled as they will readily whiten under the relatively low forces encountered when the sheet is flexed or bent. This problem is substantially reduced with the two layer structure and is completely avoided with three layer structures. Placing the stress-whitening layer in the center (neutral) plane of a three layer sheet structure minimizes accidental stress-whitening of the film during processing and casual handling. A higher percentage of heat-stable polymers may be used in the polymer blend of the stress-whitening layer without fear of significant accidental whitening. The use of this higher level of heat-stable polymer yields an embossing sheet with improved contrast.

Stress-whitening sheets, single and multilayer, of the invention are made by mixing the heat-stable polymer and the other ingredients together and coating by known techniques such as extrusion or calendaring.

A number of stress-whitening compositions are known in the art. These compositions provide acceptable contrast between image and background and have proved to be satisfactory for many applications such as sign production and identification labels. However, products which have been disclosed previously suffer from a significant disadvantage in heat stability. If such a sign or label is subjected to elevated temperatures, the image disappears. This occurs when the polymer, usually vinyl chloride or a copolymer of vinyl chloride, is raised to a temperature slightly above the annealing point.

Compositions of the present invention have been shown to survive temperatures which destroy images of earlier embossable image forming products. For instance the embossed white image formed with a commercial tape product available from ROTEX TM was destroyed within 15 seconds when exposed to a temperature of 136° C. A similar product using compositions of the present invention survived the same temperature substantially unchanged for the duration of a seven day aging experiment. The samples also survived for seven days with only minor changes at 150° C.

Sheets of the invention are useful as signs, labels, packaging, decoration, identification, and the like. The instant sheets are particularly useful in such as the electrical industry where they can be used as wire identification even in areas where the wires are exposed to prolonged periods of elevated temperatures. In a preferred embodiment for this use, the embossed sheet is provided with prepunched holes preferably horseshoe shaped, oval, round, or teardrop shaped, to provide individual tags for surrounding a continuous, elongate object such as a wire or pipe.

Sheets of the invention are used with commercially available embossing machines such as the Dymo Mite Tapewriter TM, available from Dymo Industries, Inc.

TEST METHODS

Initial White Contrast Evaluation

The film run number was embossable on a ⅜" wide strip of film with a Scotch TM EA-450 label maker, available from Minnesota Mining and Manufacturing Company, (3M), for identification and evaluation purposes. A whiteness contrast scale from 0-4 was chosen for consistency with the current rating methods in the art. A value of 4 is given to the highest white contrast and is equivalent to PVC-based Scotch TM #760 label tape, also available from 3M. A classification of 0 means that the sheet has no white contrast.

The contrast (WC) measurement is further described in U.S. Pat. Nos. 4,082,711 and 4,463,119, incorporated herein by reference.

Aging/Image Stability Test

For these studies, exposure to a temperature of 136° C. for 7 days was chosen to qualify films for a desired 105° C. rating. The film run number and the word "aged" were embossed on a 0.95 cm wide strip of each film under study, with a Scotch TM EA-450 brand label maker. Control samples, embossed with the run number and the letters "BBB", were kept at room temperature as an image and film stability reference. After exposure of the embossed film for 168 hours at 136° C., the aged samples were removed, visually inspected and compared to the control sample films for such characteristics as yellowing, white contrast retention, embrittlement, and the like.

Delamination Method

The embossed films were observed for delamination before and after embossing as well as before and after aging. Delamination of a film is noted if a layer peels away from the base film without assistance.

The following examples are for illustrative purposes only, and are not limiting to the scope of the invention. Variations within the claimed scope may easily be rendered by one skilled in the art.

EXAMPLES

Example 1

A Killion 1.25 inch single screw extruder with an L/D ratio of 24/1 was used to compound a stress-whitening polymer blend composition using the following temperature profile: zone 1, 176° C.; zone 2, 193° C.; zone 3, 226° C.; end cap, 226° C., and neck tube, 220° C.

The stress-whitening polymer blend contained 40% acrylonitrile butadiene styrene (ABS) terpolymer, "CYCOLAC DFA-1000R", available from General Electric, 59% polypropylene, "PP1024", available from Exxon, and 1% anti-oxidant, Irganox TM 1076, available from Ciba-Geigy.

Using a second 1.25 inch Brabender single screw extruder, a colored polymer blend composition was compounded using the following temperature profile: zone 1, 164° C.; Zone 2, 193° C.; Zone 3, 216° C.; Zone 4, 221° C.; end cap, 221° C., and neck tube, 221° C.

The colored polymer blend contained 89% polypropylene (PP1024), 10% carbon black concentrate, CBE 102 P, available from Charles B. Edwards and Company, and 1% anti-oxidant, (Irganox TM 1076).

The extrudate from both extruders was fed into a ten inch EDI (Extrusion Dies Inc.) multilayer extrusion die and processed using the following temperature profile: Die Temp, 221° C.; Feed block, 221° C.; Cast roll Temp, 32° C. The line speed was about 4.2 meters per minute.

The EDI die used was designed to produce a single film 1 to 40 mils thick. A three layer feedblock in combination with the die allows for the multi layer film extrusion. The upper layer of the film was the stress-whitening polymer blend. Disposed below this layer was the carbon-black filled polymer. The carbon black in this layer provided good contrast between an embossed image, which appeared white, and the general background of the film.

After extrusion, the film was cooled so that it could be wound into a non-blocking jumbo roll. This roll was then converted into sheet or tape form. Sheets of the extruded bi-layer film were tested for image contrast (white contrast ranges from 0 for poor to 4 which represents maximum contrast) as described above. The product was also tested for delamination and image stability, and the results are reported in Table 1.

Comparative Example C2

The example was made according to example 1 except the stress-whitening polymer blend contained no polypropylene. It contained 99% ABS and anti-oxidant, (1% Irganox TM 1076). The product also tested for delamination and image stability, and the results are reported in Table 1.

Comparative Example 3

The example was made according to example 1 except the colored polymer blend contained 29% polypropylene (PP1024), 60% very low density polyethylene, "Flexomer" DFDA-1138 available from Union Carbide, 10% carbon black concentrate (CBE 102 P) and 1% anti-oxidant, (Irganox TM 1076). Test results are shown in Table 1.

Example 4

The example was made according to example 3 except the stress-whitening blend contained 40% ABS (CYCOLAC DFA-1000R), 59% polypropylene (PP1024) and 1% anti-oxidant, (Irganox TM 1076). Test results are shown in Table 1.

Example 5

The example was made according to example 4 except the stress-whitening polymer blend contained 40% PMMA VM100, "VM100" available from Rohm-Haas, 59% polypropylene (PP1024) and 1% anti-oxidant, (Irganox TM 1076). Test results are shown in Table 1.

Comparative Example C6

The example was made according to example 5 except the stress-whitening polymer contained no polypropylene. The polymer contained 99% PMMA (VM100), and 1% anti-oxidant, (Irganox TM 1076). Test results are shown in Table 1.

Comparative Example C7

The example was made according to example 5 except the stress-whitening polymer was not a blend and the backing contained no flexomer. It contained 89% polypropylene (PP1024), 10% carbon black concentrate (CBE 102 P), and 1% anti-oxidant (Irganox 1076). Test results are shown in Table 1.

Example 8

The example was made according to example 7 except the stress-whitening polymer blend contained 40% PMMA VM100 (Polymethyl Methacrylate # VM100 by Rohm-Haas), 59% polypropylene (PP1024), and 1% anti-oxidant, (Irganox 1076). Test results are shown in Table 1.

TABLE 1

| EX No. | WC | Layer B (Stress-whitening) Layer C (Colored Layer) | Delam. of layers | Image Stability |
|---|---|---|---|---|
| 1 | 4.0 | B = 40% Cycolac ABS + 59% PP 1024 + 1% Irganox 1076<br>C = 89% PP 1024 + 10% black + 1% Irganox 1076 | no | slight decrease |
| C2 | 4.0 | B = 99% Cycolac ABS + 1% Irganox 1076<br>C = 89% PP 1024 + 10% black + 1% Irganox 1076 | yes | Shrinks yellows |
| C3 | 4.0 | B = 99% Cycolac ABS + 1% Irganox 1076<br>C = 29% PP 1024 + 60% DFDA-1138 (flexomer) + 10% black + 1% Irganox 1076 | yes | Shrinks yellows |
| 4 | 4.0 | B = 40% Cycolac ABS + 59% PP 1024 + 1% Irganox 1076<br>C = 29% PP 1024 + 60% DFDA-1138 (flexomer) + 10% black + 1% Irganox 1076 | no | slight decrease |
| 5 | 3.5 | B = 40% PMMA VM100 + 59% PP 1024 + 1% Irganox 1076<br>C = 29% PP 1024 + 60% DFDA-1138 (flexomer) + 10% black + 1% Irganox 1076 | no | slight decrease |
| C6 | 0 | B = 99% PMMA VM100 + 1% Irganox 1076<br>C = 29% PP 1024 + 60% DFDA-1138 (flexomer) + 10% black + 1% Irganox 1076 | partial | none |
| C7 | 0 | B = 99% PMMA VM100 + 1% Irganox 1076<br>C = 89% PP 1024 + 10% black + 1% Irganox 1076 | yes | none |
| 8 | 4.0 | B = 40% PMMA VM100 + 59% PP 1024 + 1% Irganox 1076<br>C = 89% PP 1024 + 10% black + 1% Irganox 1076 | partial | decrease WC |

Example 9

A 1.25 inch Brabender single screw extruder was used to compound a stress-whitening polymer blend composition containing 20% "Polystyrene 666" available from Dow and 80% polypropylene "PP3014", available from Exxon.

After extrusion, the film was cooled so that it may be wound into a non-blocking jumbo roll. This roll was then converted into sheet or tape form. Sheets of the extruded single layer film were tested for image contrast delamination and image stability as noted in example 1, and the results are shown in Table 2.

Example 10

This example was conducted under the same processing conditions as example 9. The single layer stress-whitening blend contained 80% polypropylene (PP3014) and 20% ABS.

Example 11

This example was conducted as described in Example 9, except that the single layer stress-whitening blend contained 80% polypropylene (PP3014), 10% ABS (CYCOLAC DFA 1000-R), and 10% polystyrene 666 (PS 666).

Example 12

This example was conducted according to Example 9. The single layer stress-whitening blend contained 80% polypropylene (PP3014), and 20% ABS (CYCO-LAC DFA 1000-R), and one part anti-oxidant (Irganox 1076).

Comparative Example C13

This example was conducted according to example 9. The single layer non stress-whitening blend contained 80% ethylene (Linear Low Density Polyethylene, LLDPE #6806 available from Dow) and 20% polystyrene (PS 666).

Comparative Example C14

The sample was made according to example 13. The single layer non stress-whitening blend contained 80% ethylene (LLDPE 6806) and 20% ABS (CYCOLAC DFA 1000-R).

Comparative Example C15

The sample was made according to example 9. The single layer stress-whitening blend contained 80% ethylene, (low density polyethylene, LDPE 1550P available from Eastman Kodak) and 20% polystyrene (PS 666).

Comparative Example C16

The sample was made according to example 15. The single layer stress-whitening blend contained 80% ethylene (LDPE 1550 P) and 20% ABS (CYCOLAC DFA 1000-R).

Comparative Example C17

The sample was made according to Example 15. The single layer stress-whitening blend contained 80% ethylene (LDPE 1550 P) and 10% ABS (CYCOLAC DFA 1000-R), and 10% polystyrene (PS 666).

Comparative Example C18

The sample was made according to example 15. The single layer stress-whitening blend contained 80% ethylene (Low Density Polyethylene, LDPE 4012, available from Dow) and 20% ABS (CYCOLAC DFA 1000-R).

Comparative Example C19

The sample was made according to example 15. The single layer stress-whitening blend contained 80% ethylene (High Density Polyethylene, HDPE 3150B, available from Amoco) and 20% ABS (CYCOLAC DFA 1000-R).

Example 20

The sample was made according to example 9. The single layer stress-whitening blend contained 59% polypropylene (PP3014), 20% ABS (CYCOLAC DFA 1000-R), 10% ethylene vinyl acetate compound (Elvax 350 available from Dupont), 10% ethylene (HDPE 3150B), and 1% antioxidant (Irganox 1076).

Example 21

The example was made according to example 20 except that the ethylene component was LDPE 1550P.

Example 22

The sample was made according to example 20. The single layer stress-whitening colored blend contained 4% polypropylene (PP3014), 20% ABS (CYCOLAC DFA 1000-R), 1% anti-oxidant (Irganox 1076), and 5% pink concentrate (specially compounded in polystyrene from Charles B. Edwards and Co.).

Example 23

The sample was made according to example 9 except that the Head PSI was 1400 and the torque was 70. The blend composition was the same as example 22 except 69% polypropylene (PP3014) and 10% pink concentrate.

Example 24

The example was made according to example 23 except that the blend composition contained 64% polypropylene (PP3014) and 15% pink concentrate.

Example 25

The example was made according to example 23 except that the blend composition contained 74% polypropylene (PP3014) and 5% blue concentrate (CBE 22452-S, blue compounded in polystyrene available from C.B. Edwards and Co.).

Example 26

The example was made according to example 25 except that the blend composition contained 69% polypropylene (PP3014) and 10% blue concentrate (CBE 22452-S).

Example 27

The example was made according to example 26 except that the blend composition contained 2.5% Blue concentrate and 2.5% pink concentrate.

Example 28

The example was made according to example 27 except that the blend composition contained 64% polypropylene (PP3014), 5% blue concentrate (CBE 22452-S) and 5% pink concentrate.

Example 29

The example was made according to example 28 except that the blend composition contained 74% polypropylene (PP3014) and 5% black concentrate (CBE 102P).

Example 30

A 34 mm co-rotating intermeshing Leistritz twin screw extruder with an L/D ratio of 42:1 was used to compound a polymer blend composition. The single layer stress-whitening colored blend contained 79% polypropylene (PP1024), 5% ABS (CYCOLAC DFA 1000-R), 15% polystyrene (PS666), and 1% anti-oxidant (Irganox 1076).

Example 31

The example was made according to example 30 except that the stress-whitening colored blend contained 10% ABS (CYCOLAC DFA 1000-R) and 10% polystyrene (PS666).

Example 32

The example was made according to example 30 except that the stress-whitening colored blend contained 74% polypropylene (PP1024), 15% ABS (CYCOLAC DFA 1000-R), and 5% polystyrene (PS666).

Example 33

The example was made according to example 30 except that the stress-whitening colored blend contained 77% polypropylene (PP1024), 5% ABS (CYCOLAC DFA 1000-R), 15% polystyrene (PS666) and 3% anti-oxidant (Irganox 1076).

Example 34

The example was made according to example 30 except that the stress-whitening colored blend contained 74% polypropylene (PP1024), 20% ABS (CYCOLAC DFA 1000-R), 2.5% blue concentrate (CBE 22452-S), 2.5% pink concentrate, and 1% anti-oxidant, (Irganox 1076).

TABLE 2

Single Layer Examples

| EX No. | WC | Single Layer (Stress-whitening) | Delam. of layers | Image Stability |
|---|---|---|---|---|
| 9 | 3 | 80% PP3014 + 20% PS 666 | N/A | brittle & yellows |
| 10 | 3.5 | 80% PP3014 + 20% ABS CYCOLAC from GE | N/A | brittle & yellows |
| 11 | 3.5 | 80% PP3014 + 10% ABS CYCOLAC + 10% PS 666 | N/A | brittle & yellows |
| 12 | 3.5 | 80% PP3014 + 20% ABS CYCOLAC + 1% Irganox 1076 | N/A | slight yellowing |
| C13 | 0 | 80% LLDPE 6806 + 20% PS 666 | N/A | none |
| C14 | 0 | 80% LLDPE 6806 + 20% ABS CYCOLAC | N/A | none |
| C15 | 2 | 80% LDPE 1550P + 20% PS 666 | N/A | none |
| C16 | 2 | 80% LDPE 1550P + 20% ABS CYCOLAC | N/A | none |
| C17 | 2 | 80% LDPE 1550P + 10% ABS CYCOLAC + 10% PS 666 | N/A | none |
| C18 | 1 | 80% LDPE 4012 + 20% ABS CYCOLAC | N/A | none |
| C19 | 1 | 80% HDPE 3150B + 20% ABS CYCOLAC | N/A | none |
| 20 | 3.5 | 59% PP3014 + 20% ABS CYCOLAC + 10% Elvax 350 + 10% HDPE 3150B + 1% Irganox 1076 | N/A | no WC |
| 21 | 3.5 | 59% PP3014 + 20% ABS CYCOLAC + 10% Elvax 350 + 10% LDPE 1550P + 1% Irganox 1076 | N/A | no WC |
| 22 | 3.0 | 74% PP3014 + 20% ABS CYCOLAC + 1% Irganox 1076 + 5% Pink Concentrate in PS | N/A | some WC remains |
| 23 | 3.0 | 69% PP3014 + 20% ABS CYCOLAC + 1% Irganox 1076 + 10% Pink Concentrate in PS | N/A | slight WC remains |
| 24 | 2.0 | 64% PP3014 + 20% ABS CYCOLAC + 1% Irganox 1076 + 15% Pink Concentrate in PS | N/A | slight WC remains |
| 25 | 2.0 | 74% PP3014 + 20% ABS CYCOLAC + 1% Irganox 1076 + 5% Blue Concentrate in PS | N/A | no WC |
| 26 | 2.0 | 69% PP3014 + 20% ABS CYCOLAC + 1% Irganox 1076 + 10% Blue Concentrate in PS | N/A | No WC |
| 27 | 3.0 | 69/5 PP3014 + 20% ABS CYCOLAC + 1% Irganox 1076 + 2.5% Blue + 2.5% Pink | N/A | some WC remains |
| 28 | 2.5 | 64% PP3014 + 20% ABS CYCOLAC + 1% Irganox 1076 + 5% Blue + 5% Pink | N/A | No test |
| 29 | 1.0 | 74% PP3014 + 20% ABS CYCOLAC + 1% Irganox 1076 + 5% CBE 102P Black | N/A | No WC remains |
| 30 | 4 | 5% Cycolac ABS + 79% PP1024 + 15% PS666 + 1% Irganox 1076 | N/A | slight WC remains |
| 31 | 3.5 | 10% Cycolac ABS + 79% PP1024 + 10% PS666 + 1% Irganox 1076 | N/A | slight WC remains |
| 32 | 4 | 15% Cycolac ABS + 74% PP1024 + 10% PS666 + 1% Irganox 1076 | N/A | slight WC remains |
| 33 | 4 | 5% Cycolac ABS + 77% PP1024 + 15% PS666 + 3% Irganox 1076 | N/A | slight WC remains |
| 34 | 3 | 20% Cycolac ABS + 74% PP80546P + 2.5% Blue + 2.5% pink + 1% Irganox 1076 | N/A | yellow & high WC |

Example C35

A Killion single screw extruder was used to compound a clear polymer blend composition for the top layer which contained 50% very low density polyethylene (Flexomer DFDA-1137, available from Union Carbide), and 50% polypropylene (Polypropylene 3014 available as PP 3014 from Exxon).

A second single screw extruder (1 inch screw with L/D ratio of 19:1) was used to compound a stress-whitening polymer blend composition which contained 20% ABS (CYCOLAC DFA 1000-R), 55% polypropylene (PP3014) and 25% polybutylene (PB0400 available from Shell Chemical).

Using a third single screw extruder (Brabender 1 inch screw with L/D ratio of 30:1) a colored polymer blend composition was compounded which contained 89% polypropylene (PP3014), 10% carbon black concentrate (CBE 102P with a carbon black let down ratio of 1:100 available from Charles B. Edwards & Company) and 25% butylene (Polybutylene PB0400 available from Shell).

The extrudate from all three extruders was fed into a multilayer coextrusion feedblock atop an EDI (Extrusion Dies Incorporated) extrusion die. This feedblock/die combination was designed to produce a multilayer film 25 μ (1 mil) to 1 millimeter (40 mils) thick. The top layer of the film was produced as a clear polymer blend to enhance clarity and reduce excessive stress-whitening. The stress-whitening layer was placed in the center on a neutral plane to protect it from handling problems. The bottom layer contained a colored polymer blend. The color in this layer provided good contrast between the embossed image, which appeared white, and the general background of the film. Disposed between the clear top coat and the colored layer was the stress-whitening layer.

The same after-extrusion processing and evaluations apply as in example 1. Examples C35–C39 show that when a multilayer embossing tape is made without anti-oxidant, the image stability is adversely affected; yellowing is seen as well as loss of white contrast and brittleness.

Example C36

The example was made according to example C35 except the stress-whitening center layer contained 20% ABS (CYCOLAC DFA 1000-R) and 80% polypropylene (PP3014). The colored polymer blend contained 20% ABS (CYCOLAC DFA 1000-R), 10% black concentrate (CBE 102P), and 70% polypropylene (PP3014).

Example C37

The example was made according to example C36 except the top clear layer polymer blend contained 40% very low density polyethylene (Flexomer DFDA-1137), and 60% polypropylene (PP3014).

Example C38

The example was made according to example C37 except the stress-whitening polymer blend contained 40% ABS (CYCOLAC DFA 1000-R) and 60% polypropylene (PP3014).

Example C39

The example was made according to example C38 except the top clear layer polymer blend contained 20% very low density polyethylene (Flexomer DFDA-1137), and 80% polypropylene (PP3014).

Example 40

The example was made according to example 35 except that the top clear layer was compounded in a single screw extruder with a 1 inch screw and L/D ratio of 19:1.

The top layer contained 40% very low density polyethylene(Flexomer DFDA-1138, available from Union Carbide), 58% polypropylene (PP 3014) and 2% anti-oxidant (Irganox 1076).

A second single screw extruder (Brabender extruder, 1.25 inch screw with L/D ratio of 30:1) was used to compound a stress-whitening polymer blend composition which contained 20% acrylonitrile butadiene styrene (ABS) terpolymer e.g. (Lustran ABS available from Monsanto), 58% polypropylene (PP1024 ) and 2% anti-oxidant (Irganox 1076).

A third single screw Killion extruder was used to extrude the third layer which contained 100% polypropylene (PP1024).

The extrudate from all three extruders was fed into a multilayer coextrusion feedblock atop an extrusion die. This feedblock/die combination was designed to produce a multilayer film from 25 μ to 1 millimeter in thickness.

Example 41

The example was made according to example 40 except that the bottom layer contained a colored polymer blend of 89% polypropylene (PP1024), 10% black concentrate (CBE 102P) and 1% anti-oxidant (Irganox 1076).

Example 42

The example was made according to example 41 except that the colored polymer blend contained 88% polypropylene (PP1024), 10% pink concentrate (specially compounded in polystyrene from Charles B. Edwards), and 2% anti-oxidant (Irganox 1076).

Example 43

The example was made according to example 42 except that the colored polymer blend contained 68% polypropylene (PP1024), 30% blue concentrate (CBE 22452S), and 2% anti-oxidant (Irganox 1076).

Example 44

The example was made according to example 43 except that the colored polymer blend contained 88% polypropylene (PP1024), 10% black concentrate (CBE 102 P), and 2% anti-oxidant (Irganox 1076).

Example 45

The example was made according to example 44 except that the clear top layer contained 40% very low density polyethylene (Flexomer DFDA-1138 available from Union Carbide), 59% polypropylene (PP 1024), and 1% antioxidant (Irganox 1076). The center stress-whitening layer contained 40% ABS (Lustran available from Monsanto) and 1% anti-oxidant (Irganox 1076). The bottom layer contained 99% polypropylene (PP1024) and 1% anti-oxidant (Irganox 1076).

Example 46

The example was made according to example 45 except that the bottom layer contained a polymer blend of 59% polypropylene (PP1024), 40% very low density polyethylene (Flexomer DFDA-1138), and 1% anti-oxidant (Irganox 1076).

Example 47

The example was made according to example 46 except that the bottom layer contained a polymer blend of 39% polypropylene (PP1024), 60% very low density polyethylene (Flexomer DFDA-1138), and 1% anti-oxidant (Irganox 1076).

Example 48

The example was made according to example 47 except that the bottom layer colored polymer blend contained 29% polypropylene (PP1024), 60% very low density polyethylene (Flexomer DFDA-1138), 10% black concentrate (CBE 102P) and 1% anti-oxidant (Irganox 1076).

Example 49

The example was made according to example 48 except that the stress-whitening polymer blend contained 40% ABS (Magnum 9010 available from Dow), 59% polypropylene (PP1024) and 1% anti-oxidant (Irganox 1076).

Example 50

The example was made according to example 49 except that the stress-whitening polymer blend contained a different type of ABS, i.e., Magnum 941 available from Dow.

Example 51

The example was made according to example 50 except the stress-whitening polymer blend contained a different type of ABS, i.e., Magnum 343 available from Dow.

Example 52

The example was made according to example 51 except the stress-whitening polymer blend contained a different type of ABS, i.e., Cycolac DFA-1000R available from General Electric.

Example 53

The example was made according to example 52 except that the stress-whitening polymer blend contained 40% Polymethyl Methacrylate (PMMA VM100 available from Rohm and Haas), 59% polypropylene (PP1024) and 1% anti-oxidant (Irganox 1076).

Example 54

The example was made according to example 53 except that the stress-whitening polymer blend contained 99% Polymethyl Methacrylate (PMMA VM100 available from Rohm and Haas) and 1% anti-oxidant (Irganox 1076).

Example 55

The example was made according to example 52 except that the stress-whitening polymer blend contained 40% styrene (polystyrene, PS 685 available from Dow), 59% polypropylene (PP1024) and 1% anti-oxidant (Irganox 1076).

Example 56

The example was made according to example 55 except that the stress-whitening polymer blend contained 99% styrene (polystyrene, PS 685) and 1% anti-oxidant (Irganox 1076).

Example 57

The example was made according to example 56. The stress-whitening polymer blend contained 40% polycarbonate (polycarbonate "Makrolon" 2600 available from Mobay), 59% polypropylene (PP1024) and 1% anti-oxidant (Irganox 1076).

Example 58

The example was made according to example 57 except that the extruders were set at: top clear layer 10 RPM, center stress-whitening layer, 35 RPM and bottom colored polymer blend, 15 RPM. The stress-whitening polymer blend contained 5% polycarbonate (polycarbonate "Makrolon" 2600 available from Mobay), 94% polypropylene (PP1024) and 1% anti-oxidant (Irganox 1076).

Example 59

The example was made according to example 56 except that the stress-whitening polymer blend contained 40% Styrene Acrylonitrile (SAN "Tyril" available from Dow), 59% polypropylene (PP1024) and 1% anti-oxidant (Irganox 1076).

Example 60

The example was made according to example 59 except the stress-whitening polymer blend contained 99% Styrene Acrylonitrile (SAN "Tyril" available from Dow) and 1% anti-oxidant (Irganox 1076).

Example 61

The example was made according to example 53 except that the colored polymer blend contained 89% polypropylene (PP1024), 10% black concentrate (CBE 102P) and 1% anti-oxidant (Irganox 1076).

Example 62

The example was made according to example 61 except that the stress-whitening polymer blend contained 99% Polymethyl Methacrylate (PMMA VM100 available from Rohm and Haas) and 1% anti-oxidant (Irganox 1076).

Example 63

The example was made according to example 62 except that the stress-whitening polymer blend contained 40% ABS (Cycolac DFA-1000R), 59% polypropylene (PP1024), and 1% anti-oxidant (Irganox 1076). The colored polymer blend contained 89% polypropylene (polypropylene, PP4092 available from Exxon), 10% black concentrate (CBE 102P) and 1% anti-oxidant (Irganox 1076).

Example 64

Examples 64 through 66 demonstrate a variety of pigments types and amounts in the backing layer of the multilayer embossed tape of the invention.

Example 64 was made according to example 63 except that the clear top layer extruder head PSI was 2000 and the amps were set at 3 amps. The center stress-whitening layer extruder Head PSI was 1750 and the torque was 104. The bottom colored polymer blend extruder temperature profile was zone 1 at 160° C., zone 2 at 186° C., zone 3 at 221° C., head PSI at 2000 PSI, and the screw RPM at 25 RPM. The feedback used was a 5 layer feedblock manufactured by Peter Cloeren and Co. Two vanes were pinched off to produce the three layer film.

The colored polymer blend layer contained 89% polypropylene (polypropylene, PP1024 available from Exxon), 10% blue concentrate (blue concentrate compounded in polypropylene, CBE 22087 P, available from C.B. Edwards and Co.), and 1% anti-oxidant (Irganox 1076).

Example 65

The example was made according to example 64 except that the colored polymer blend contains blue concentrate compounded in polystyrene (CBE 22452-S, available from C.B. Edwards and Co.

Example 66

The example was made according to example 65 except the center stress-whitening layer extruder Head PSI was 2120 and the torque was 128. The bottom colored polymer blend extruder temperature profile was set for zone 1 at 150° C., Zone 2 at 177° C., head PSI at 4000 PSI, and the screw RPM at 60 RPM. The top clear polymer blend contained 40% Ultra Low Density Polyethylene (Flexomer DFDA-1138 from Union Carbide), 59.5% polypropylene (PP1024), and 0.5% anti-oxidant (Irganox 1076). The stress-whitening polymer blend contained 40% ABS (Cycolac DFA-1000R), 59.5% polypropylene (PP1024) and 0.5% antioxidant (Irganox 1076). The colored polymer blend contained 89.5% polypropylene (polypropylene, PP1024 available from Exxon), 10% black (CBE 102P) and 0.5% anti-oxidant (Irganox 1076).

Example 67

The example was made according to example 66 except that the colored polymer blend contained a polypropylene homopolymer compounded with 89.5% polypropylene/polyethylene co-polymer (PP 7C50 available from Shell Chemical Co.).

Example 68

The example was made according to example 67 except that the clear top layer polymer blend contained 59.5% polypropylene (PP1024), 30% very low density polyethylene (Flexomer DFDA-1138), 10% Ionomer (Surlyn 1702 available from Dupont) and 0.5% anti-oxidant (Irganox 1076).

Example 69

Examples 69-72 vary the type of flexomer and the type of ABS resin used. As can be seen, flexomer DFDA-9063 has a negative effect on yellowing of the white contrast, and so is not preferred.

Example 69 was made according to example 61 except that the top clear polymer blend contained 20% very low density polyethylene (Flexomer DFDA-9063 from Union Carbide), 79.5% polypropylene (PP1024), and 0.5% antioxidant (Irganox 1076). The stress-whitening polymer blend contained 40% ABS (Cycolac GSE available from General Electric), 59.5% polypropylene (PP1024) and 0.5% anti-oxidant (Irganox 1076). The colored polymer blend comprised 86.5% polypropylene (polypropylene, PP1024 available from Exxon), 10% black (CBE 102P), 3% Ionomer (Surlyn 1702 available from Dupont), and 0.5% antioxidant (Irganox 1076).

Example 70

The example was made according to example 69 except that the stress-whitening center layer contained ABS (Cycolac DFA-1000R available from General Electric).

Example 71

The example was made according to example 70 except that the top clear polymer blend comprised 20% very low density polyethylene (Flexomer DFDA-1138 from Union Carbide), 79.5% polypropylene (PP1024), and 0.5% anti-oxidant (Irganox 1076).

Example 72

The example was made according to example 71 except that the stress-whitening center layer contained ABS (Cycolac GSE, available from General Electric).

Example 73

Examples 73-80 demonstrate the ability to increase the nonpolypropylene polymer content in the stress-whitening layer of the embossing tape of the invention.

Example 73 was made according to example 72 except that the stress-whitening center layer comprised 100% polypropylene (polypropylene, PP1024).

Example 74

The example was made according to example 73 except that the stress-whitening polymer blend contained 5% ABS (Cycolac DFA-1000R, available from General Electric), 94.5% polypropylene (PP1024) and 0.5% anti-oxidant (Irganox 1076).

Example 75

The example was made according to example 74 except the stress-whitening polymer blend contained 10% ABS (Cycolac DFA-1000R, available from General Electric), 89.5% polypropylene (PP1024) and 0.5% anti-oxidant (Irganox 1076).

Example 76

The example was made according to example 75 except the stress-whitening polymer blend contained 15% ABS (Cycolac DFA-1000R), 84.5% polypropylene (PP1024) and 0.5% anti-oxidant (Irganox 1076).

Example 77

The example was made according to example 76 except the stress-whitening polymer blend contained 20% ABS (Cycolac DFA-1000R), 79.5% polypropylene (PP1024) and 0.5% anti-oxidant (Irganox 1076).

Example 78

The example was made according to example 77 except the stress-whitening polymer blend contained 25% ABS (Cycolac DFA-1000R), 74.5% polypropylene (PP1024) and 0.5% anti-oxidant (Irganox 1076).

Example 79

The example was made according to example 78 except the stress-whitening polymer blend contained 30% ABS (Cycolac DFA-1000R), 69.5% polypropylene (PP1024) and 0.5% anti-oxidant (Irganox 1076).

Example 80

The example was made according to example 79 except the stress-whitening polymer blend contained 35% ABS (Cycolac DFA-1000R), 64.5% polypropylene (PP1024) and 0.5% anti-oxidant (Irganox 1076).

Example 81

The example was made according to example 79 except the cast roll was set at 10° C. The top clear polymer blend contained 10% very low density polyethylene (Flexomer DFDA-1138 from Union Carbide), 89.75% polypropylene (PP1024), and 0.25% anti-oxidant (Irganox 1076). The stress-whitening polymer blend contained 30% ABS (Cycolac DFA-1000R), 69.75% polypropylene (PP1024) and 0.25% anti-oxidant (Irganox 1076). The bottom colored polymer blend comprised 86.75% polypropylene (PP1024), 10% black (CBE 102P), 3% Ionomer (Surlyn 1702 available from Dupont), and 0.25% anti-oxidant (Irganox 1076).

Example 82

A single screw Killion extruder was used to compound a clear polymer blend composition for the top layer which contained 99.25% polypropylene (PP 1024), 0.25% nucleating agent/clarifying agent (MILLAD 3905 available from Milliken Chemical) and 0.5% anti-oxidant (Irganox 1076).

A second single screw extruder (Berlyn 2 inch extruder with an L/D ratio of 32:1) was used to compound a stress-whitening polymer blend composition which contained 30% ABS (Cycolac DFA-1000R), 69.25% polypropylene (PP1024), 0.25% nucleating agent (MILLAD 3905), and 0.5% anti-oxidant (Irganox 1076).

A 34 mm co-rotating intermeshing Leistritz twin screw extruder with an L/D ratio of 42:1 was used to compound a colored polymer blend composition comprising 89.25% polypropylene (PP1024), 10% carbon black (CBE 102P), 0.25% nucleating agent (MILLAD 3905), and 0.5% anti-oxidant (Irganox 1076).

The extrudate from all three extruders was fed into a multilayer coextrusion feedblock atop an extrusion die as outlined in example 35.

Example 83

The example was made according to example 82 except that the clear top polymer blend contained 20% ultra low density polyethylene (Flexomer DFDA-1138), 69.25% polypropylene (PP1024), 0.25% nucleating agent (MILLAD 905), and 0.5% anti-oxidant (Irganox 1076).

Example 84

The example was made according to example 35 except that a single screw (1" screw with L/D ratio of 19:1) extruder was used to compound the clear polymer blend composition.

The top layer contained 20% very low density polyethylene (Flexomer DFDA-1138), and 79.5% polypropylene (PP1024 from Exxon) and 0.5% anti-oxidant (Irganox 1076).

A second single screw Killion extruder was used to compound a stress-whitening polymer blend composition which comprised 30% ABS (Cycolac DFA-1000R), 69.5% polypropylene (PP1024), and 0.5% anti-oxidant (Irganox 1076) and was coated with a third single screw Killion extruder.

The colored polymer blend contained 86.5% polypropylene (PP1024), 10% carbon black (CBE 102P), 3% Ionomer (Surlyn 1702), and 0.5% anti-oxidant (Irganox 1076).

Example 85

This example was made according to example 84 except that the top layer contained 17% very low density polyethylene (Flexomer DFDA-1138), and 79.5% polypropylene (PP1024 from Exxon), 3% Ionomer (Surlyn ™ 1702), and 0.5% anti-oxidant (Irganox ™ 1076).

Example 86

A Killion 2.54 cm single screw extruder with an L/D ratio of 42/1 was used to compound a stress-whitening polymer blend composition comprising 69.5% polymethylpentene (TPX MX007, available from Mitsui Chemical), 30% acrylonitrile-butadiene-styrene terpolymer and 0.5% antioxidant (Irganox ™ 1076).

A second Killion 2.54 cm single screw extruder with an L/D ratio of 42/1 was used to compound a second polymer blend contained 99.5% polymethylpentene (TPX MX007, available from Mitsui Chemical), 30% acrylonitrile-butadiene-styrene terpolymer and 0.5% antioxidant (Irganox ™ 1076).

The extrudate from both extruders was fed into a multilayer extrusion die and process for a three layer film extrusion. The outer layers, i.e., the top and bottom layers were composed of the second polymer blend. The stress-whitening layer was the center layer.

Example C87

This Example was made according to example 86, except that the stress-whitening layer comprised 99.5% ABS, and 0.5% antioxidant (Irganox ™ 1076).

TABLE 3

| EX No. | WC | Layer A (clear top) Layer B (stress-whitening) layer C (colored bottom) | Delam. of Layers | Image Stability |
|---|---|---|---|---|
| C35 | 2.5 | A = 50% DFDA-1137 (flexomer) + 50% PP 3014<br>B = 25% PB0400 + 20% Cycolac ABS + 55% PP3014<br>C = 25% PB0400 + 20% Cycolac ABS + 10% black + 45% PP3014 | none | none |
| C36 | 2.0 | A = 50% DFDA-1137 + 50% PP 3014<br>B = 20% Cycolac ABS + 80% PP 3014<br>C = 20% Cycolac ABS + 10% black + 70% PP3014 | none | none |
| C37 | 2.5 | A = 40% DFDA-1137 (flexomer) + 60% PP 3014<br>B = 20% Cycolac ABS + 80% PP3014<br>C = 20% Cycolac ABS + 10% black + 70% PP3014 | none | none |
| C38 | 3.5 | A = 40% DFDA-1137 (flexomer) + 60% PP 3014<br>B = 40% Cycolac ABS + 60% PP3014<br>C = 20% Cycolac ABS + 10% black + 70% PP3014 | slight | brittle & yellowed |
| C39 | 3.5 | A = 20% DFDA-1137 (flexomer) + 70% PP 3014<br>B = 20% Cycolac ABS + 80% PP3014<br>C = 20% Cycolac ABS + 10% black + 70% PP3014 | slight | brittle & yellowed |
| 40 | 3.5 | A = 40% DFDA-1138 + 50% PP 1024 + 2% Irganox 1076<br>B = 40% Lustran ABS + 58% PP 1024 + 2% Irganox 1076<br>C = 100% PP 1024 | none | yellowed |
| 41 | 3.0 | A = 40% DFDA-1138 + 58% PP 1024 + 2% Irganox 1076<br>B = 40% Lustran ABS + 58% PP 1024 + 2% Irganox 1076<br>C = 89% PP 1024 + 10% black + 1% Irganox 1076 | none | yellowed |
| 42 | 4.0 | A = 40% DFDA-1138 + 58% PP 1024 + 2% Irganox 1076<br>B = 40% Lustran ABS + 58% PP 1024 + 2% Irganox 1076<br>C = 88% PP 1024 + 10% Pink + 2% Irganox 1076 | none | high WC |
| 43 | 4.0 | A = 40% DFDA-1138 + 58% PP 1024 + 2% Irganox 1076<br>B = 40% Lustran ABS + 58% PP 1024 + 2% Irganox 1076<br>C = 68% PP 1024 + 30% Blue + 2% Irganox 1076 | none | very high WC |
| 44 | 4.0 | A = 40% DFDA-1138 + 58% PP 1024 + 2% Irganox 1076<br>B = 40% Lustran ABS + 58% PP 1024 + 2% Irganox 1076<br>C = 88% PP 1024 + 10% black + 2% Irganox 1076 | none | yellow |
| 45 | 4.0 | A = 40% DFDA-1138 + 59% PP 1024 + 1% Irganox 1076<br>B = 40% Lustran ABS + 59% PP 1024 + 1% Irganox 1076<br>C = 99% PP 1024 + 1% Irganox 1076 | none | No WC |
| 46 | 4.0 | A = 40% DFDA-1138 + 59% PP 1024 + 1% Irganox 1076<br>B = 40% Lustran ABS + 59% PP 1024 + 1% Irganox 1076<br>C = 59% PP1024 + 40% DFDA-1138 (flexomer) + 1% Irganox 1076 | none | No WC |
| 47 | 4.0 | A = 40% DFDA-1138 + 59% PP 1024 + 1% Irganox 1076<br>B = 40% Lustran ABS + 59% PP 1024 + 1% Irganox 1076 | none | No WC |

TABLE 3-continued

Trilayer Examples

| EX No. | WC | Layer A (clear top) Layer B (stress-whitening) layer C (colored bottom) | Delam. of Layers | Image Stability |
|---|---|---|---|---|
| | | C = 39% PP 1024 + 60% DFDA-1138 + 1% Irganox 1076 | | |
| 48 | 3.5 | A = 40% DFDA-1138 + 59% PP 1024 + 1% Irganox 1076<br>B = 40% Lustran ABS + 59% PP 124 + 1% Irganox 1076<br>C = 29% PP 124 + 60% DFDA-1138 + 10% black + 1% Irganox 1076 | none | slight decrease in WC |
| 49 | 3.5 | A = 40% DFDA-1138 + 59% PP 1024 + 1% Irganox 1076<br>B = 40% Dow Magnum 9010 ABS + 59% PP 1024 + 1% Irganox 1076<br>C = 29% PP 1024 + 60% DFDA-1138 + 10% black + 1% Irganox 1076 | none | slight decrease in WC |
| 50 | 3.0 | A = 40% DFDA-1138 + 59% PP 1024 + 1% Irganox 1076<br>B = 40% Dow Magnum 941 ABS + 59% PP 1024 + 1% Irganox 1076<br>C = 29% PP 1024 + 60% DFDA-1138 + 10% black + 1% Irganox 1076 | none | slight decrease in WC |
| 51 | 3.0 | A = 40% DFDA-1138 + 59% PP 1024 + 1% Irganox 1076<br>B = 40% Dow Magnum 343 ABS + 59% PP 1024 + 1% Irganox 1076<br>C = 29% PP 1024 + 60% DFDA-1138 + 10% black + 1% Irganox 1076 | none | slight decrease in WC |
| 52 | 3.5 | A = 40% DFDA-1138 + 59% PP 1024 + 1% Irganox 1076<br>B = 40% GE Cycolac ABS + 59% PP 1024 + 1% Irganox 1076<br>C = 29% PP 1024 + 60% DDFDA-1138 + 10% black + 1% Irganox 1076 | none | slight dcrease in WC |
| 53 | 3.0 | A = 40% DFDA-1138 + 59% PP 1024 + 1% Irganox 1076<br>B = 40% PMMA VM100 + 59% PP 1024 + 1% Irganox 1076<br>C = 29% PP 1024 + 60% DFDA-1138 + 10% black + 1% Irganox 1076 | none | slight decreae in WC |
| 54 | 0 | A = 40% DFDA-1138 + 59% PP 1024 + 1% Irganox 1076<br>B = 99% PMMA VM100 + 1% Irganox 1076<br>C = 29% PP 1024 + 60% DFDA-1138 + 10% black + 1% Irganox 1076 | yes | slight decrease in WC |
| 55 | 3.0 | A = 40% DFDA-1138 + 59% PP 1024 + 1% Irganox 1076<br>B = 40% PS 685 + 59% PP 1024 + 1% Irganox 1076<br>C = 29% PP 1024 + 60% DFDA-1138 + 10% black + 1% Irganox 1076 | none | decrease in WC |
| 56 | 1.0 | A = 40% DFDA-1138 + 59% PP 1024 + 1% Irganox 1076<br>B = 99% PS 685 + 1% Irganox 1076<br>C = 29% PP 1024 + 60% DFDA-1138 + 10% black + 1% Irganox 1076 | yes | No WC |
| 57 | 3.0 | A = 40% DFDA-1138 + 59% PP 1024 + 1% Irganox 1076<br>B = 40% PC MAKROLON 2600 + 59% PP 1024 + 1% Irganox 1076<br>C = 29% PP 1024 + 60% DFDA-1138 + 10% black + 1% Irganox 1076 | no | High WC |
| 58 | 3.0 | A = 40% DFDA-1138 + 59% PP 1024 + 1% Irganox 1076<br>B = 5% PC MAKROLON 2600 + 94% PP 1024 + 1% Irganox 1076<br>C = 29% PP 1024 + 60% DFDA-1138 + 10% black + 1% Irganox 1076 | no | Decrease in WC |
| 59 | 3.5 | A = 40% DFDA-1138 + 59% PP 1024 + 1% Irganox 1076<br>B = 40% SAN Tryl + 59% PP 1024 + 1% Irganox 1076<br>C = 29% PP 1024 + 60% DFDA-1138 + 10% black + 1% Irganox 1076 | no | Decrease in WC |
| 60 | 0 | A = 40% DFDA-1138 + 59% PP 1024 + 1% Irganox 1076<br>B = 99% SAN Tyril + 1% Irganox 1076<br>C = 29% PP 1024 + 60% DFDA-1138 + 10% black + 1% Irganox 1076 | yes | No WC |
| 61 | 3.5 | A = 40% DFDA-1138 + 59% PP 1024 + 1% Irganox 1076<br>B = 40% PMMA VM100 + 59% PP 1024 + 1% Irganox 1076<br>C = 89% PP 1024 + 10% black + 1% Irganox 1076 | no | slight decrease |
| 62 | 0 | A = 40% DFDA-1138 + 59% PP 1024 + 1% Irganox 1076<br>B = 99% PMMA VM100 + 1% Irganox 1076<br>C = 89% PP 1024 + 10% black + 1% Irganox 1076 | yes | no WC |
| 63 | 4.0 | A = 40% DFDA-1138 + 59% PP 1024 + 1% Irganox 1076<br>B = 40% Cycolac ABS + 59% PP 1024 + 1% Irganox 1076<br>C = 89% PP4092 + 10% black + 1% Irganox 1076 | slight | High WC |
| 64 | 4.0 | A = 40% DFDA-1138 (flexomer) + 59% PP 1024 + 1% Irganox 1076<br>B = 40% Cycolac ABS + 59% PP 1024 + 1% Irganox 1076<br>C = 89% PP 1024 + 10% blue in PP + 1% Irganox 1076 | no | slightly yellowed and decrease WC |
| 65 | 4.0 | A = 40% DFDA-1138 (flexomer) + 59% PP 1024 + 1% Irganox 1076<br>B = 40% Cycolac ABS + 59% PP 1024 + 1% Irganox 1076<br>C = 89% PP 1024 + 10% blue in PS + 1% Irganox 1076 | no | slightly yellowed |
| 66 | 4.0 | A = 40% DFDA-1138 (flexomer) + 59.5% PP 1024<br>B = 40% Cycolac ABS + 59.5% PP 1024 + 0.5% Irganox 1076<br>C = 89.5% PP 1024 + 10% CBE 102 P (black) + 0.5% Irganox 1076 | no | decrease in WC |
| 67 | 4.0 | A = DFDA-1138 (flexomer) + 59.5% PP 1024 + 0.5% Irganox 1076<br>B = 40% Cycolac ABS + 59.5% PP 1024 + 0.5% Irganox 1076<br>C = 89.5% PP/PE 7C50 + 10% CBE 102 P (black) + 0.5% Irganox 1076 | no | decrease in WC |
| 68 | 4.0 | A = 30% DFDA-1138 + 10% Surlyn + 59.5% PP 1024 + 0.5% Irganox 1076<br>B = 40% Cycolac ABS + 59.5% PP 1024 + 0.5% Irganox 1076<br>C = 89.5% PP/PE 7C50 + 10% CBE 102 P (black)+ 0.5% Irganox 1076 | no | yellowed decrease in WC |
| 69 | 4.0 | A = 20% DFDA-9063 + 79.5% PP 1024 + 0.5% Irganox 1076<br>B = 40% Cycolac GSE ABS + 59.5% PP 1-024 + 0.5% Irganox<br>C = 86.5% PP 1024 + 10% black + 3% Surlyn + 0.5% Irganox | no | severely yellowed decrease in WC |
| 70 | 4.0 | A = 20% DFDA-9063 + 79.5% PP 1024 + 0.5% Irganox 1076<br>B = 40% Cycolac DFA-1000R ABS + 59.5% PP 1024 + 0.5% Irganox<br>C = 86.5% PP 1024 + 10% black + 3% Surlyn + 0.5% Irganox | slight | slight yellowed WC |
| 71 | 4.0 | A = 20% DFDA-1138 + 79.5% PP 1024 + 0.5% Irganox 1076<br>B = 40% Cycolac DFA-1000R ABS + 59.5% PP 1024 + 0.5% Irganox<br>C = 86.5% PP 1024 + 10% black + 3% Surlyn + 0.5% Irganox | no | slight decrease in WC |
| 72 | 4.0 | A = 20% DFDA-1138 + 79.5% PP 1024 + 0.5% Irganox 1076<br>B = 40% Cycolac GSE ABS + 59.5% PP 1024 + 0.5% Irganox<br>C = 86.5% PP 1024 + 10% black + 3% Surlyn + 0.5% Irganox | no | slighy yellowed slight decrease in WC |
| 73 | 0 | A = 20% DFDA-1138 + 79.5% PP 1024 + 0.5% Irganox 1076 | no | no WC |

TABLE 3-continued

Trilayer Examples

| EX No. | WC | Layer A (clear top) Layer B (stress-whitening) layer C (colored bottom) | Delam. of Layers | Image Stability |
|---|---|---|---|---|
|  |  | B = 100% PP 1024<br>C = 86.5% PP 1024 + 10% black + 3% Surlyn + 0.5% Irganox |  |  |
| 74 | 1.5 | A = 20% DFDA-1138 + 79.5% PP 1024 + 0.5% Irganox 1076<br>B = 5% Cycolac DFA-1000R ABS + 94.5% PP 1024 + 0.5% Irganox<br>C = 86.5% PP 1024 + 10% black + 3% Surlyn + 0.5% Irganox | no | slight WC |
| 75 | 2.0 | A = 20% DFDA-1138 + 79.5% PP 1024 + 0.5% Irganox 1076<br>B = 10% Cycolac DFA-1000R ABS + 89.5% PP 1024 + 0.5% irganox<br>C = 86.5% PP 1024 + 10% balck + 3% Surlyn + 0.5% Irganox | no | slight loss in WC |
| 76 | 2.5 | A = 20% DFDA-1138 + 79.5% PP 1024 + 0.5% Irganox 1076<br>B = 15% Cycolac DFA-1000R ABS + 84.5% PP 1024 + 0.5% Irganox<br>C = 86.5% PP 1024 + 10% black + 3% Surlyn + 0.5% Irganox | no | slight loss in WC |
| 77 | 3.0 | A = 20% DFDA-1138 + 79.5% PP 1024 + 0.5% Irganox 1076<br>B = 20% Cycolac DFA-1000R ABS + 79.5% PP 1024 0.5% Irganox<br>C = 86.5% PP 1024 + 10% black + 3% Surlyn + 0.5% Irganox | no | slightloss in WC |
| 78 | 3.5 | A = 20% DFDA-1138 + 79.5% PP 1024 + 0.5% Irganox 1076<br>B = 25% Cycolac DFA-1000R ABS + 74.5% PP 1024 + 0.5% Irganox<br>C = 86.5% PP 1024 + 10% black + 3% Surlyn + 0.5% Irganox | no | slightly yellowed |
| 79 | 4.0 | A = 20% DFDA-1138 + 79.5% PP 1024 + 0.5% Irganox 176<br>B = 30% Cycolac DFA-1000R ABS + 69.5% PP 1024 + 0.5% Irganox<br>C = 86.5% PP 1024 + 10% black + 3% Surlyn + 0.5% Irganox | no | slightly yellowed sl. loss WC |
| 80 | 4.0 | A = 20% DFDA-1138 + 79.5% PP 1024 + 0.5% Irganox 1076<br>B = 35% Cycolac DFA-1000R ABS + 64.5% PP 1024 + 0.5% Irganox<br>C = 86.5% PP 1024 + 10% black + 3% Surlyn + 0.5% Irganox | no | yellowed high contrast |
| 81 | 4.0 | A = 10% DFDA-1138 + 89.75% PP 1024 + 0.25% Irganox 1076<br>B = 30% Cycolac DFA-1000R ABS + 69.75% PP 1024 + 0.25% Irganox<br>C = 86.75% PP 1024 + 10% black + 3% Surlyn + 0.25% Irganox | no | yellowed high contrast |
| 82 | 3.0 | A = 99.25% PP 1024 + 0.5% Irganox 1076 + .25% MILLAD 3905<br>B = 30% Cycolac DFA-1000R ABS + 69.25% PP 1024 + 0.5% Irganox + 0.25% MILLAD 3905<br>C = 89.25% PP 1024 + 10% black + 0.25% MILLAD 3905 | no | slightly yellowed high contrast |
| 83 | 4.0 | A = DDFDA-1138+ 69.25% PP 1024 + 0.5% Irganox 1076 + 0.25% MILLAD 3905<br>B = 30% Cycolac DFA-10000R ABS + 69.25% PP 1024 + 0.5% Irganox + 0.25% MILLAD 3905<br>C = 89.25% PP 1024 + 10% black + 0.5% Irganox + 0.25% MILLAD 3905 | no | slightly yellowed high contrast |
| 84 |  | A = 20% DFDA-1138 + 79.5% PP 1024 + 0.5% Irganox 1076<br>B = 30% Cycolac DFA-1000R ABS + 69.5% PP 1024 + 0.5% Irganox<br>C = 86.5% PP 1024 + 10% black + 3% Surlyn + 0.5% Irganox<br>LAYERS ½:½:½ | no | some WC loss |
| 85 |  | A = 17% DFDA-1138 + 79.5% PP 1024 + 3% Surlyn + 0.5% Irganox 1076<br>B = 30% Cycolac DFA-1000R ABS + 69.5% PP 1024 + 0.5% Irganox<br>C = 86.5% PP 1024 + 10% black + 3% Surlyn + 0.5% Irganox | no | yellowed high contrast |
| 86 | 3.0 | A = 99.5% PMP TPX MX007 + 0.5% Irganox 1076<br>B = 69.5% PMP TPX MX007 + 30% ABS Dow Magnum + 0.5% Irganox<br>C = 99.5% PMP TPX MX007 + 0.5% Irganox 1076 | no | slight WC remains |
| C87 | 3.0 | A = 99.5% PMP TPX MX007 + 0.5% Irganox 1076<br>B = 99.5% ABS Dow magnum + 0.5% Irganox<br>C = 99.5% PMP TPX MX007 + 0.5% Irganox 1076 | yes | no white contrast |

What is claimed is:

1. An embossable sheet comprising at least one layer which exhibits stress-whitening upon the application of pressure consisting essentially of a blend of:
   a) a polypropylene polymer,
   b) at least one other polymeric material immiscible therewith, said polymeric material selected from the group consisting of acrylonitrile-butadiene-styrene copolymers, polymethylmethacrylate polymers, polystyrene polymers, polycarbonate polymers, and styrene acrylonitrile copolymers and
   c) an effective amount of an antioxidant, said sheet exhibiting stress-whitening which is stable at 136° C. for at least about 7 days.

2. An embossable sheet according to claim 1 wherein said stress-whitening is stable to about 150° C. for at least about 7 days.

3. An embossable sheet according to claim 1 wherein said blend comprises a major proportion of polypropylene and a minor proportion of acrylonitrile-butadiene-styrene copolymer.

4. An embossable sheet according to claim 1 comprising from about 95% to about 99.9% of a blend of copolymers, said blend comprising from about 55% to about 95% polypropylene, and from about 5% to about 45% of a copolymer immiscible therewith, said sheet further comprising from about 0.1 to about 5% antioxidant.

5. An embossable sheet according to claim 4 wherein said blend comprises from about 55% to about 75% polypropylene, and from about 25% to about 45% acrylonitrile-butadiene-styrene.

6. A multilayer embossable sheet comprising at least one layer consisting essentially of a blend according to claim 1 and at least one other layer.

7. A multilayer embossable sheet according to claim 6 wherein said other layer is a pigmented layer thereunder.

8. An embossable sheet according to claim 6 further comprising a transparent top layer coated atop said stress-whitening layer.

9. An embossable sheet according to claim 1 having holes punched therein at intervals.

10. An embossable tape capable of being applied by an embossing tool, comprising an embossable sheet containing a stress-whitening layer according to claim 1 having a layer of adhesive affixed thereto.

11. An embossable tape comprising an embossable sheet containing a stress-whitening layer according to claim 1 wherein said embossable sheet comprises a transparent layer over said stress-whitening layer, and a colored layer under said stress-whitening layer.

12. An embossable tape according to claim 10 wherein said stress-whitening layer consists essentially of a polymeric blend comprising a major proportion of polypropylene and a minor proportion of acrylonitrile-butadiene-styrene.

13. A wire-identification label capable of being applied by an embossing tool, comprising a sheet according to claim 1, said sheet having a least one hole punched therein.

14. A wire-identification label according to claim 1 having a least one teardrop shaped hole punched therein.

15. A wire-identification label according to claim 13 having at least one horseshoe shaped hole punched therein.

16. A wire-identification label according to claim 15 also having at least one teardrop shaped hole punched therein.

* * * * *

UNITED STATES PATENT AND TRADEMARK OFFICE
CERTIFICATE OF CORRECTION

PATENT NO.     :   5,284,694

DATED          :   February 8, 1994

INVENTOR(S)    :   Rochelle L. Lockridge, Dennis L. Krueger, Philip G. Martin and Gary W. Schlaeger It is certified that error appears in the above-identified patent and that said Letters Patent is hereby corrected as shown below:

Column 9, Line 67, "4%" should read --74%--.

Column 21, Table 3, Example 52, "60% DDFDA-1138" should read --60% DFDA-1138--.

Column 22, Table 3, Example 61, below "slight decrease" insert --in WC--.

Column 23, Table 3, Example 83, "DDFDA-1138" should read --DFDA-1138--.

Column 23, Table 3, Example 83, "Cycolac DFA-10000R ABS" should read --Cycolac DFA-1000R ABS--.

Column 24, Table 3, Example 77, "slightloss" should read --slight loss--.

Column 24, Table 3, Example 78, below "slightly yellow" insert --slight loss WC--.

Signed and Sealed this

Twenty-seventh Day of September, 1994

Attest:

BRUCE LEHMAN

*Attesting Officer*        *Commissioner of Patents and Trademarks*